United States Patent
Lu (10) Patent No.: US 9,954,944 B2
(45) Date of Patent: Apr. 24, 2018

(54) DATA SHARING METHOD, CLIENT AND SYSTEM

(71) Applicant: TENCENT TECHNOLOGY (SHENZHEN) COMPANY LIMITED, Shenzhen (CN)

(72) Inventor: Yisha Lu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 216 days.

(21) Appl. No.: 14/744,126

(22) Filed: Jun. 19, 2015

(65) Prior Publication Data

US 2015/0288761 A1 Oct. 8, 2015

Related U.S. Application Data

(63) Continuation of application No. PCT/CN2013/090281, filed on Dec. 24, 2013.

(30) Foreign Application Priority Data

Dec. 24, 2012 (CN) .......................... 2012 1 0566237

(51) Int. Cl.
*H04L 29/08* (2006.01)
*H04L 29/12* (2006.01)
*G06F 21/41* (2013.01)

(52) U.S. Cl.
CPC .......... *H04L 67/1095* (2013.01); *H04L 61/10* (2013.01); *H04L 67/02* (2013.01); *G06F 21/41* (2013.01)

(58) Field of Classification Search
CPC ......... H04L 67/02; H04L 67/10; H04L 51/08; G06F 21/41
(Continued)

(56) References Cited

U.S. PATENT DOCUMENTS 6,233,608 B1 * 5/2001 Laursen .................. G06F 21/41
707/999.01
6,963,901 B1 11/2005 Bates et al.
(Continued)

FOREIGN PATENT DOCUMENTS

CN 101009576 A 8/2007
CN 101924779 A 12/2010
(Continued)

OTHER PUBLICATIONS

International Search Report for International Application No. PCT/CN2013/090281, dated Apr. 3, 2014.
(Continued)

*Primary Examiner* — Ranodhi Serrao
*Assistant Examiner* — James Fiorillo (57) ABSTRACT

A data sharing method, client and system are described. The data sharing method includes logging in to a browser of a first client and a browser of at least one second client using a communication account. The data sharing method further includes acquiring, by the first client, shared data from the browser of the first client if receiving a data sharing instruction and selecting, by the first client, at least one sharing client from the at least one second client and acquiring an address identifier of each of the at least one sharing client, and sending, by the first client, the shared data to the at least one sharing client according to the address identifier of each of the at least one sharing client.

5 Claims, 6 Drawing Sheets

(58) Field of Classification Search
USPC ......... 709/203, 204, 217, 219, 228; 715/750
See application file for complete search history.

(56) References Cited

U.S. PATENT DOCUMENTS

| | | | | |
|---|---|---|---|---|
| 9,451,312 | B2* | 9/2016 | Zhang | H04N 21/4126 |
| 2004/0044776 | A1* | 3/2004 | Larkin | H04L 67/06 |
| | | | | 709/228 |
| 2007/0162605 | A1 | 7/2007 | Chalasani et al. | |
| 2011/0167355 | A1* | 7/2011 | Shelansky | G06F 21/41 |
| | | | | 715/750 |
| 2012/0166583 | A1* | 6/2012 | Koonce | G06F 17/30861 |
| | | | | 709/217 |
| 2013/0013931 | A1* | 1/2013 | O'Hare | H04L 9/0822 |
| | | | | 713/189 |
| 2013/0017526 | A1* | 1/2013 | Nguyen | G09B 7/02 |
| | | | | 434/362 |
| 2013/0073692 | A1* | 3/2013 | Isaza | H04L 67/1095 |
| | | | | 709/219 |
| 2013/0191896 | A1* | 7/2013 | Adderly | H04W 12/06 |
| | | | | 726/6 |
| 2013/0304815 | A1* | 11/2013 | Puente | H04L 67/10 |
| | | | | 709/204 |
| 2013/0305322 | A1* | 11/2013 | Raleigh | G06Q 30/016 |
| | | | | 726/4 |
| 2013/0325935 | A1* | 12/2013 | Kiley | G06F 17/30867 |
| | | | | 709/203 |
| 2013/0336337 | A1* | 12/2013 | Gopinath | H04L 45/24 |
| | | | | 370/474 |
| 2014/0082117 | A1* | 3/2014 | Unhale | H04L 67/306 |
| | | | | 709/208 |
| 2014/0310349 | A1* | 10/2014 | Rainisto | G06Q 50/01 |
| | | | | 709/204 |

FOREIGN PATENT DOCUMENTS

| | | |
|---|---|---|
| CN | 101933013 A | 12/2010 |
| CN | 102340540 A | 2/2012 |
| CN | 103024062 A | 4/2013 |

OTHER PUBLICATIONS

Chinese Office Action for Application No. 201210566237.7 dated Aug. 23, 2013, and an English concise explanation of relevance thereof.
International Preliminary Report for Application No. PCT/CN2013/090281 dated Jul. 9, 2015.

* cited by examiner

DATA SHARING METHOD, CLIENT AND SYSTEM

CROSS-REFERENCE TO RELATED APPLICATIONS

This application is a continuation of International Patent Application No. PCT/CN2013/090281, filed Dec. 24, 2013. This application claims the benefit and priority of Chinese Application No. 201210566237.7, filed Dec. 24, 2012. The entire disclosures of each of the above applications are incorporated herein by reference.

FIELD

The present disclosure relates to internet technologies and to a data sharing method, client, and system.

BACKGROUND

This section provides background information related to the present disclosure which is not necessarily prior art.

With the development of the internet, using the internet to implement data sharing between clients has gradually become a common tool. A typical method of implementing data sharing between clients is through the use of a wire connection. For example, a mobile phone is connected with a personal computer (PC) through a data line so as to transmit data between the mobile phone and the PC. Through this method, it is necessary to first connect the clients via wire connections before data sharing, and thus, the operation of data sharing is complicated. Further, this method is also limited by the various means for making connections. For example, unless there is a wireless connection, data sharing cannot be implemented. Moreover, if wire interfaces between the clients are not matched, then normal wire connection cannot be established, and thus, data sharing cannot be implemented.

SUMMARY

This section provides a general summary of the disclosure, and is not a comprehensive disclosure of its full scope or all of its features.

Various embodiments of the present disclosure provide a data sharing method, client, and system, which can implement data sharing between clients without limitation of connection manners, and can simplify operations of data sharing and thus improve the efficiency of data sharing.

Various embodiments of the present disclosure provide a data sharing method, which can involve various operations, including logging in to a browser of a first client and a browser of at least one second client using a communication account;

acquiring, by the first client, shared data from the browser of the first client if receiving a data sharing instruction;

selecting, by the first client, at least one sharing client from the at least one second client and acquiring an address identifier of each of the at least one sharing client; and sending, by the first client, the shared data to the at least one sharing client according to the address identifier of each of the at least one sharing client.

Various embodiments of the present disclosure provide a client, which can involve various operations, including a data acquisition module configured to, after a communication account is logged in to a browser of the local client and a browser of at least one second client, if receiving a data sharing instruction, acquire shared data from the browser of the local client;

an address acquisition module configured to, select at least one sharing client from the at least one second client, and acquiring an address identifier of each of the at least one sharing client; and a sharing module configured to send the shared data to the at least one sharing client according to the address identifier of each of the at least one sharing client.

Various embodiments of the present disclosure provide a data sharing system, which can include a shared data providing client and a shared data receiving client;

wherein the shared data providing client includes the following:

a data acquisition module configured to, after a communication account is logged in to the shared data providing client and the shared data receiving client, acquire shared data from the shared data providing client if receiving a data sharing instruction;

an address acquisition module configured to, acquire an address identifier of the shared data receiving client;

a sharing module configured to send the shared data to the shared data receiving client according to the address identifier of the shared data receiving client; and the shared data receiving client is configured to receive the shared data and output the shared data.

According to various embodiments of the present disclosure, after multipoint login of the communication account from the browser of the first client and the browser of at least one second client, the first client can select at least one sharing client from the at least one second client according to the data sharing instruction, and sends the shared data in the browser of the first client to the sharing client, thereby realizing data sharing between the first client and the sharing client. According to various embodiments of the present disclosure, the data sharing can be implemented based on the communication account, the first client and the sharing client need not be connected by wires. Therefore, the operations of the data sharing are simple and the efficiency of the data sharing is enhanced.

Further areas of applicability will become apparent from the description provided herein. The description and various embodiments in this summary are intended for purposes of illustration and are not intended to limit the scope of the present disclosure.

DRAWINGS

The drawings described herein are for illustrative purposes of various embodiments and not all possible implementations, and are not intended to limit the scope of the present disclosure.

In order to more clearly illustrate technical methods of embodiments of the present disclosure, the figures which are used in the description of the embodiments will be briefly described in the following. The figures in the following description are various embodiments of the present disclosure, and those skilled in the art will be able to obtain other figures based on the following figures without creative work.

Corresponding reference numerals indicate corresponding parts throughout the several views of the drawings.

DETAILED DESCRIPTION

Example embodiments will now be described more fully with reference to the accompanying drawings.

For simplicity and illustrative purposes, the present disclosure is described by referring mainly to examples thereof. In the following description, numerous details are set forth in order to provide a thorough understanding of the present disclosure. It will be readily apparent however, that the present disclosure may be practiced without limitation to these details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to various embodiments of the present disclosure, a first client can be any one client in a data sharing system and can be any one of terminal devices such as a PC, a tablet PC, a mobile phone, a smart phone, an e-reader, and a notebook computer. Alternatively, the first client can be a client module in a terminal device, for example, a browser client, and so on. A second client can be any one or more clients in the data sharing system, except for the first client, and can be any one of terminal devices such as a PC, a tablet PC, a mobile phone, a smart phone, an e-reader, and a notebook computer. Alternatively, the second client can be a client module in a terminal device, for example, a browser client, and so on. According to various embodiments of the present disclosure, shared data includes but is not limited to, one or more of a website, text data, image data, audio data, and video data. One of the first client and the second client can be used to provide shared data and can be referred to as a shared data providing client; the other one of the first client and the second client can be used to receive the shared data and can be referred to as a shared data receiving client.

The data sharing method provided according to various embodiments of the present disclosure will be described in detail hereinafter with reference to FIGS. 1-3.

Figure 1:
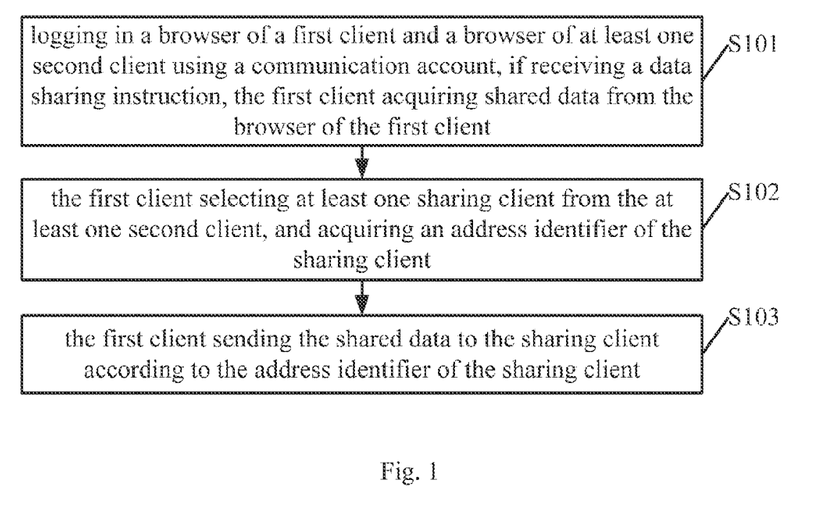
FIG. 1 is a flow chart of a data sharing method according to various embodiments.

FIG. 1 is a flow chart of a data sharing method according to various embodiments of the present disclosure. Various embodiments describe the process of the data sharing method form a first client side. Referring to FIG. 1, the data sharing method can include following S101 through S103.

S101: Logging in to a browser of a first client and a browser of at least one second client using a communication account, if receiving a data sharing instruction, the first client acquiring shared data from the browser of the first client. The communication account logged in to the browser of the first client and the browser of at least one second client refers to multipoint login of the same communication account from the browser of the first client and the browser of at least one second client. After multipoint login of the communication account is executed, when a user of the first client wants to share the data in the browser of the first client with the second client, the user may send the data sharing instruction to the first client and the first client acquires the data instructed by the data sharing instruction. For instance, after the communication account is logged in to from a PC and a mobile phone, if a user of the PC wants to share a website of a current webpage in a browser of the PC with the mobile phone, so as to utilize mobility and convenience of the mobile phone and view the current webpage on the PC anytime and anywhere. In this operation, the user of the PC may send the data sharing instruction to the PC to instruct the PC to share the website of the current webpage and the PC may obtain the website of the current webpage from the browser.

S102: The first client selects at least one sharing client from the at least one second client, and acquires an address identifier of the sharing client.

S103: The first client sends the shared data to the sharing client according to the address identifier of the sharing client.

In S102-S103, the first client can select all or some of the second clients as the sharing clients according to actual needs of users, and send the shared data to the selected sharing clients, so as to realize data sharing between the first client and the selected sharing clients.

According to various embodiments of the present disclosure, after multipoint login of the communication account from the browser of the first client and the browser of at least one second client, the first client can select at least one sharing client from the at least one second client according to the data sharing instruction, and sends the shared data in the browser of the first client to the sharing client, thereby realizing data sharing between the first client and the sharing client. According to various embodiments of the present disclosure, the data sharing can be implemented based on the communication account, the first client and the sharing client need not be connected by wires. Therefore, the operations of the data sharing are simple and the efficiency of the data sharing is enhanced.

Figure 2:
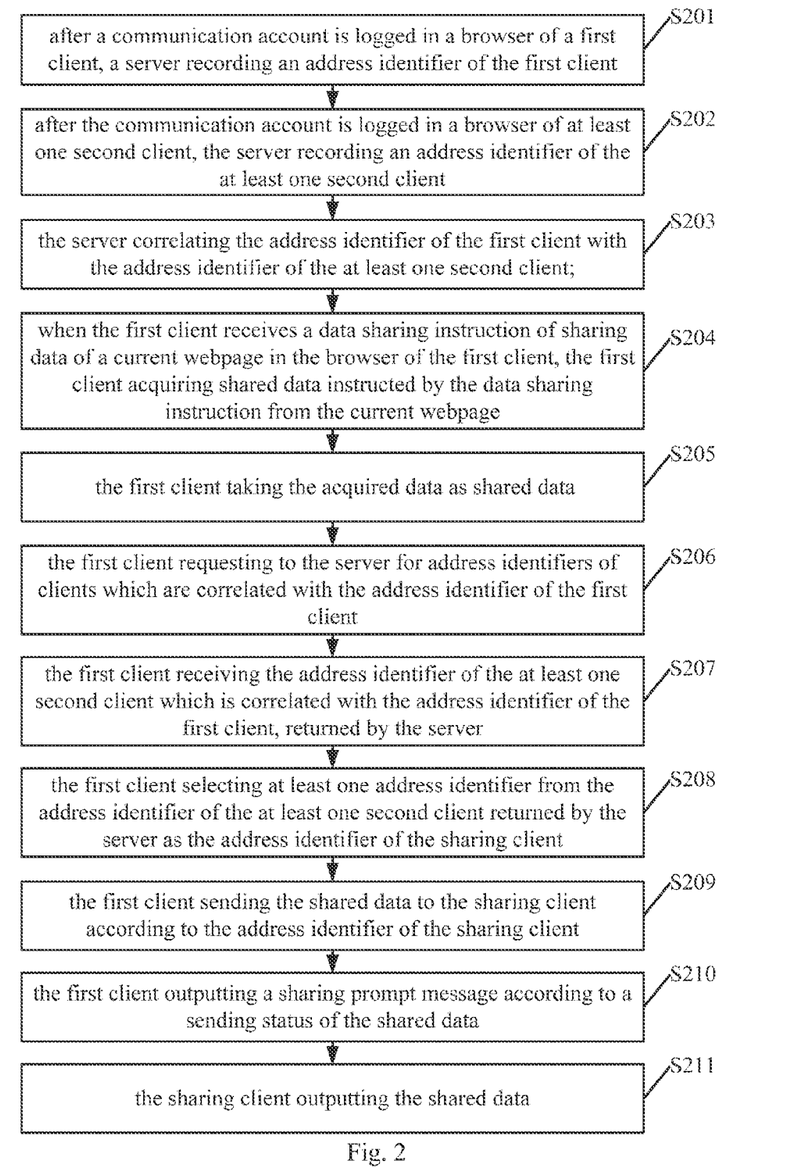
FIG. 2 is a flow chart of another data sharing method according to various embodiments.

FIG. 2 is a flow chart of another data sharing method according to various embodiments of the present disclosure. Various embodiments describe the process of the data sharing method form interaction among a first client, second client, a server, and a sharing client. The method can include following S201-S211.

S201: After a communication account is logged in to a browser of a first client, a server records an address identifier of the first client:

S202: After the communication account is logged in to a browser of at least one second client, the server records an address identifier of the at least one second client. The address identifier can uniquely identify the client. A communication with the client can be performed through the address identifier of the client. For example, the address identifier can be a phone number of a mobile terminal and other mobile terminals, PC's IP address, etc.

S203: The server correlates the address identifier of the first client with the address identifier of the at least one second client. The server correlates clients from which the same communication account is logged in to at multiple points with each other, so that data sharing can be realized between the correlated clients.

S204: When the first client receives a data sharing instruction of sharing data of a current webpage in the browser of the first client, the first client acquires shared data instructed by the data sharing instruction from the current webpage.

When a user of the first client wants to share the data in the browser of the first client with the second client, the user may send the data sharing instruction to the first client and the first client acquires the shared data instructed by the data sharing instruction. For instance, if a user of a mobile phone wants to share an image of a current webpage in a browser of the mobile phone with a PC so as to utilize a big screen of the PC and conveniently view the image in the current page in the mobile phone. In this operation, the user of the mobile phone may send the data sharing instruction to the mobile phone to instruct the mobile phone to share a website of the current webpage and the mobile phone may obtain the image in the current page from the browser.

S205: The first client takes the acquired data as shared data.

S206: The first client requests to the server for address identifiers of clients which are correlated with the address identifier of the first client. The first client can send a request message to the server. The request message carries the logged-in communication account in the browser of the first client and the address identifier of the first client. The server finds all clients from which the communication account is already logged in to, according to the communication account in the request message. The server finds the address identifier of the at least one second client which is correlated with the address identifier of the first client, according to the address identifier in the request message. The server returns the found address identifier of the second client to the first client.

S207: The first client receives the address identifier of the at least one second client which is correlated with the address identifier of the first client, returned by the server.

S208: The first client selects at least one address identifier from the address identifier of the at least one second client returned by the server as the address identifier of the sharing client. In this block, the first client can select all the second clients returned by the server as sharing clients, or can select some of the second clients returned by the server as sharing clients, according to actual needs of users.

S209: The first client sends the shared data to the sharing client according to the address identifier of the sharing client.

S210: The first client outputs a sharing prompt message according to a sending status of the shared data. The sharing prompt message is configured to prompt the user of the sending status of the shared data. For example, the sharing prompt message can be "data is being sent", "data sent successfully, please check", or "data sent failure, the network is busy, please try again later" etc. The first client outputs the sharing prompt message so that the user can intuitively and clearly understand the sending status of the shared data, thereby enhancing interaction between the client and the user.

S211: The sharing client outputs the shared data.

In actual applications, the sharing client may output the shared data according to actual needs of the user of the sharing client. For instance, if the shared data is a website, the sharing client may input the website in an address bar of the browser and display a webpage corresponding to the webpage in the browser. In the alternative, if the shared data is text information, the sharing client may display the text information or output the text information after editing the text information (for example, insert the text information in a file). In another alternative, if the first data is picture information, the sharing client may set the picture information as desktop wallpaper and display the desktop wallpaper. In another alternative, if the shared data is audio and video information, the sharing client may play the audio and video information. It should be noted that if the shared data is the audio and video information, the first client may share the audio and video information and playback process information with the sharing client. When the sharing client outputs the audio and video information, the sharing client may continue to play the audio and video information or replay the audio and video information to effectively enhance the experiences of the user.

According to various embodiments of the present disclosure, after multipoint login of the communication account from the browser of the first client and the browser of at least one second client, the first client can select at least one sharing client from the at least one second client according to the data sharing instruction, and sends the shared data in the browser of the first client to the sharing client, thereby implementing data sharing between the first client and the sharing client. According to various embodiments of the present disclosure, the data sharing can be implemented based on the communication account, the first client and the sharing client need not be connected by wires. Therefore, the operations of the data sharing are simple and the efficiency of the data sharing is enhanced.

The above process for sharing data may be described hereinafter through various embodiments.

Assuming that the first client is a PC and the second clients include two clients which can be iPhone phone and Android phone, respectively. After a communication account is logged in to the PC, the iPhone phone, and the Android phone, if the user of the PC wants to share a website of a current page on the PC to the iPhone phone to utilize convenience of the iPhone phone and view the current page on the PC anytime and anywhere, the process of sharing data provided by various embodiments of the present disclosure may be as follows.

After the communication account is logged in to a browser of the PC, a browser of the iPhone phone and a browser of the Android phone, respectively, the server records address identifiers of the PC, the iPhone phone, and the Android phone, respectively, and correlates the address identifier of the PC with the address identifiers of the iPhone phone and the Android phone.

Figure 3A:
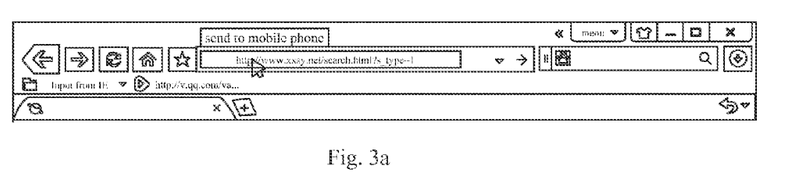
FIG. 3a is a diagram showing an effect of data sharing provided according to various embodiments.

FIG. 3a is a diagram showing an effect of data sharing according to various embodiments of the present disclosure. As shown in FIG. 3a, when the user of the PC selects the website of the current page in the address bar of the browser of the PC, after N milliseconds, the PC may output a button of "send to mobile phone". If the user clicks the button, the data sharing instruction may be sent out. N is a positive integer and N may be set as needed. Since the address bar of the browser is set to input the website, the input operation of the user may be immediately performed by selecting the address bar. According to various embodiments of the present disclosure, a setting may be made to make a response to the data sharing operation of the user after N milliseconds to distinguish the input operation of the user and effectively avoid a false operation. After the PC receives the data sharing instruction from the user, the PC may obtain the website of the current page selected by the user from the address bar of the browser and take the website as the shared data.

Figure 3B:
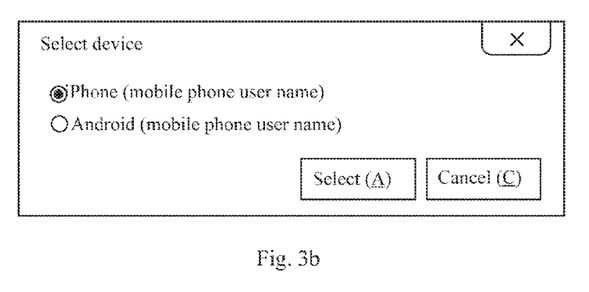
FIG. 3b is a diagram showing another effect of data sharing according to various embodiments.

The PC sends a request message to the server. The request message carries the logged-in communication account in the browser of the PC and the address identifier of the PC. The server returns the address identifiers of the iPhone phone and the Android phone which are correlated with the address identifier of the PC to the PC according to the request message. FIG. 3b is a diagram showing another effect of data sharing according to various embodiments of the present disclosure. The PC may select the address identifier of the iPhone phone in the diagram shown in FIG. 3b as the address identifier of the sharing client, and sends the shared data to the iPhone phone. i.e., sending the website of the current webpage in the browser of the PC.

Figure 3C:
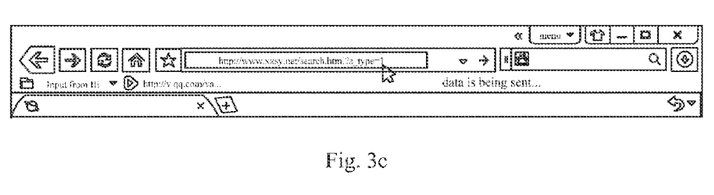
FIG. 3c is a diagram showing yet another effect of data sharing according to various embodiments.
Figure 3D:
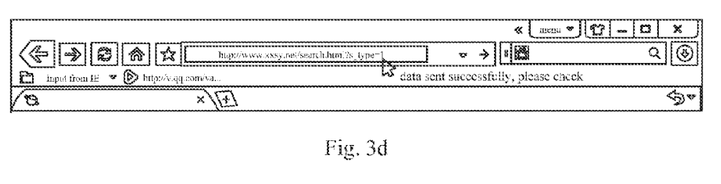
FIG. 3d is a diagram showing still another effect of data sharing according to various embodiments.
Figure 3E:
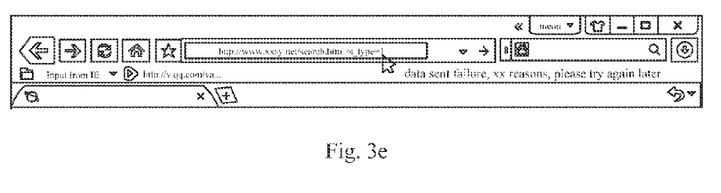
FIG. 3e is a diagram showing still yet another effect of data sharing according to various embodiments.

FIG. 3c is a diagram showing yet another effect of data sharing according to various embodiments of the present disclosure. FIG. 3d is a diagram showing still another effect of data sharing according to various embodiments of the present disclosure. FIG. 3e is a diagram showing another effect of data sharing according to various embodiments of the present disclosure. Referring to FIGS. 3a-3e, the PC outputs the sharing prompt message according to the sending status of the shared data.

Figure 3F:
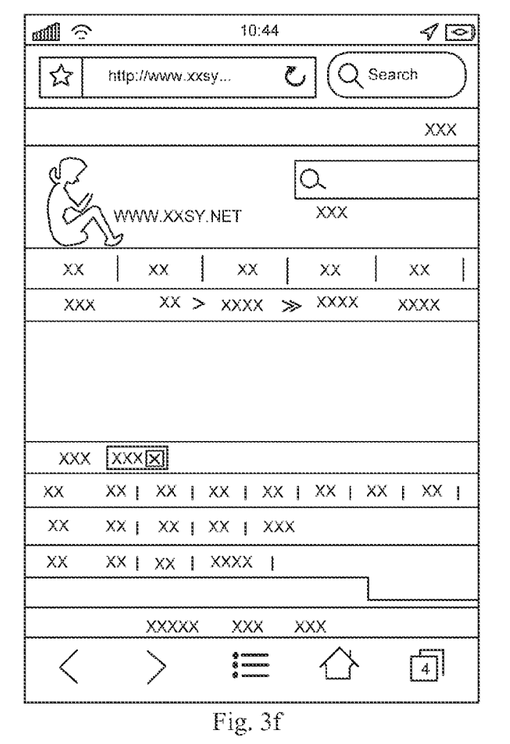
FIG. 3f is a diagram showing still yet another effect of data sharing according to various embodiments.

FIG. 3f is a diagram showing another effect of data sharing according to various embodiments of the present disclosure. As shown in FIG. 3f, after the iPhone phone receives the website of the current webpage in the browser of the PC, the iPhone phone may input the website in the browser and display the current page of the PC corresponding to the website.

According to various embodiments, FIG. 3 is one example. The process of sharing data in the case that the first clients share a variety of information, such as picture information, text information, audio and video information, etc., can refer to various embodiments shown in FIG. 3, and will not be repeated here.

According to various embodiments of the present disclosure, after multipoint login of the communication account from the browser of the first client and the browser of at least one second client, the first client can select at least one sharing client from the at least one second client according to the data sharing instruction, and sends the shared data in the browser of the first client to the sharing client, thereby realizing data sharing between the first client and the sharing client. According to various embodiments of the present disclosure, the data sharing can be implemented based on the communication account, the first client and the sharing client need not be connected by wires. Therefore, the operations of the data sharing are simple and the efficiency of the data sharing is enhanced.

The client according to various embodiments of the present disclosure will be described in detail hereinafter with reference to FIGS. 4-7. The following client can be the first client of the various embodiments of the present disclosure. It should be noted, the following client can be applied to the above method.

Figure 4:
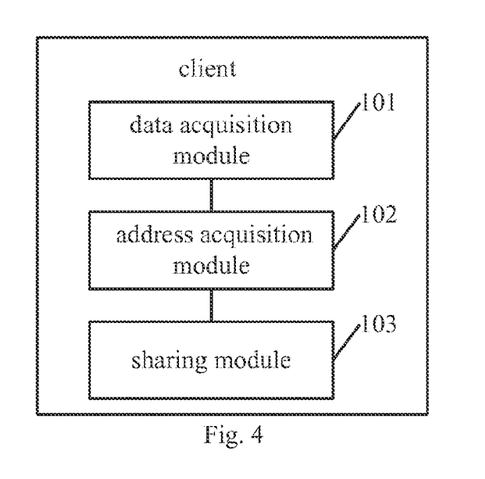
FIG. 4 is a diagram of a client provided according to various embodiments.

FIG. 4 is a diagram of a client according to various embodiments of the present disclosure. The client of the present disclosure can be used as the first client. Referring to FIG. 4, the client can include a data acquisition module 101, an address acquisition module 102, and a sharing module 103.

The data acquisition module 101 is configured to, after a communication account is logged in a browser of the local client and a browser of at least one second client, if receiving a data sharing instruction, acquire shared data from the browser of the local client.

The communication account logged in to the browser of the first client and the browser of at least one second client refers to multipoint login of the same communication account from the browser of the first client and the browser of at least one second client. After multipoint login of the communication account is executed, when a user of the first client wants to share the data in the browser of the first client with the second client, the user may send the data sharing instruction to the first client and the first client acquires the data instructed by the data sharing instruction. For instance, after the communication account is logged in to from a PC and a mobile phone, if a user of the PC wants to share a website of a current webpage in a browser of the PC with the mobile phone, so as to utilize mobility and convenience of the mobile phone and view the current webpage on the PC anytime and anywhere. In this operation, the user of the PC may send the data sharing instruction to the PC to instruct the PC to share the website of the current webpage and the data acquisition module 101 may obtain the website of the current webpage from the browser.

The address acquisition module 102 is configured to select at least one sharing client from the at least one second client and acquire an address identifier of the sharing client. The sharing module 103 is configured to send the shared data to the sharing client according to the address identifier of the sharing client. The address acquisition module 102 can select all or some of the second clients as the sharing clients according to actual needs of users. The sharing module 103 can send the shared data to the selected sharing clients, so as to realize data sharing between the first client and the selected sharing clients.

Figure 5:
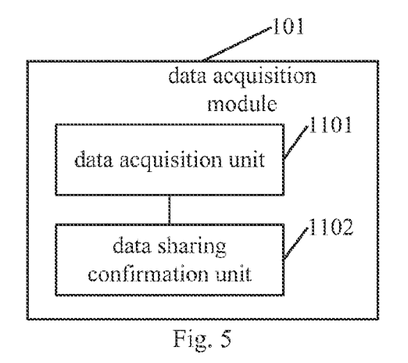
FIG. 5 is a diagram according to various embodiments of a data acquisition module shown in FIG. 4.

Each module of the client shown in FIG. 4 will be described in detail hereinafter. FIG. 5 is a diagram according to various embodiments of the data acquisition module shown in FIG. 4. Referring to FIG. 5, the data acquisition module 101 can include a data acquisition unit 1101 and a data sharing confirmation unit 1102. The data acquisition unit 1101 is configured to, after receiving the data sharing instruction of sharing the data of the current webpage in the browser of the local client, acquire the data instructed by the data sharing instruction from the current webpage.

When a user of the first client wants to share the data in the browser of the first client with the second client, the user may initiate the data sharing instruction to the first client and the data acquisition unit 1101 acquires the shared data instructed by the data sharing instruction. For instance, if a user of a mobile phone wants to share an image of a current webpage in a browser of the mobile phone with a PC so as to utilize a big screen of the PC and conveniently view the image in the current page in the mobile phone. In this operation, the user of the mobile phone may initiate the data sharing instruction to the mobile phone to instruct the mobile phone to share a website of the current webpage and the data acquisition unit 1101 may obtain the image in the current page from the browser.

The data sharing confirmation unit 1102 is configured to take the acquired data as shared data.

Figure 6:
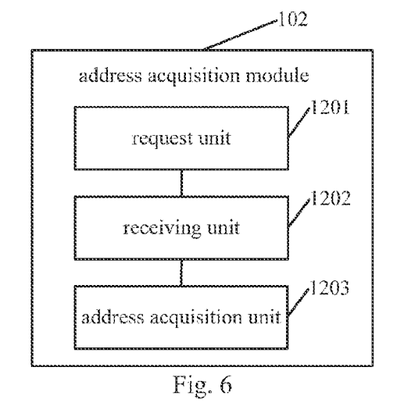
FIG. 6 is a diagram according to various embodiments of an address acquisition module shown in FIG. 4.

FIG. 6 is a diagram according to various embodiments of the address acquisition module shown in FIG. 4. Referring to FIG. 6, the address acquisition module 102 can include a request unit 1201, a receiving unit 1202, and an address acquisition unit 1203.

The request unit 1201 is configured to request the server for address identifiers of clients which correlate with the address identifier of the local client. The request unit 1201 can send a request message to the server. The request message carries the logged-in communication account in the browser of the first client and the address identifier of the first client. The server finds all clients from which the communication account is already logged in, according to the communication account in the request message. The server finds the address identifier of the at least one second client which is correlated with the address identifier of the first client, according to the address identifier in the request message. The server returns the found address identifier of the second client to the first client. The receiving unit 1202 is configured to receive the address identifier of the at least one second client which correlates with the address identifier of the local client, returned by the server.

The address acquisition unit 1203 is configured to select at least one address identifier from the address identifier of the at least one second client returned by the server as the address identifier of the sharing client. The address acquisition unit 1203 can select all the second clients returned by the server as sharing clients, or can select some of the second clients returned by the server as sharing clients, according to actual needs of users.

According to various embodiments of the present disclosure, after multipoint login of the communication account from the browser of the first client and the browser of at least one second client, the first client can select at least one sharing client from the at least one second client according to the data sharing instruction, and sends the shared data in the browser of the first client to the sharing client, thereby implementing data sharing between the first client and the sharing client. According to various embodiments of the present disclosure, the data sharing can be implemented based on the communication account, the first client and the sharing client need not be connected by wires. Therefore, the operations of the data sharing are simple and the efficiency of the data sharing is enhanced.

Figure 7:
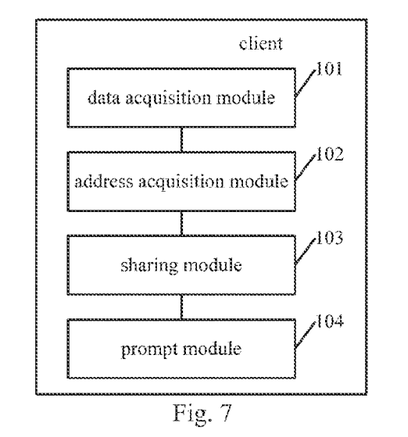
FIG. 7 is a diagram of another client provided according to various embodiments.

FIG. 7 is a diagram of another client according to various embodiments of the present disclosure. Referring to FIG. 7, the client can include a data acquisition module 101, an address acquisition module 102, a sharing module 103, and a prompt module 104. Structures of the data acquisition module 101, the address acquisition module 102, and the sharing module 103 can refer to related various embodiments shown in FIGS. 4-6, and will not be repeated here.

The prompt module 104 is configured to output a sharing prompt message according to a status of the shared data sent by the sharing module 103. The sharing prompt message is configured to prompt the user of the sending status of the shared data. For example, the sharing prompt message can be "data is being sent", "data sent successfully, please check", or "data sent failure, the network is busy, please try again later", etc. The prompt module 104 outputs the sharing prompt message so that the user can intuitive clearly understand the sending status of the shared data, thereby enhancing interaction between the client and the user.

It should be noted that structures and functions of the client according to various embodiments of the present disclosure can refer to implementations of the methods shown in FIGS. 1-3, and will not be repeated here.

According to various embodiments of the present disclosure, after multipoint login of the communication account from the browser of the first client and the browser of at least one second client, the first client can select at least one sharing client from the at least one second client according to the data sharing instruction, and sends the shared data in the browser of the first client to the sharing client, thereby realizing data sharing between the first client and the sharing client. According to various embodiments of the present disclosure, the data sharing can be realized based on the communication account, the first client and the sharing client need not be connected by wires. Therefore, the operations of the data sharing are simple and the efficiency of the data sharing is enhanced.

Various embodiments of the present disclosure also provide a data sharing system, which includes a first client, at least one second client, and a server. Structures of the first client can refer to related description of the embodiments shown in FIGS. 4-7, and will not be repeated here. It should be noted that the system of the various embodiment can be applied to the above method.

Figure 8:
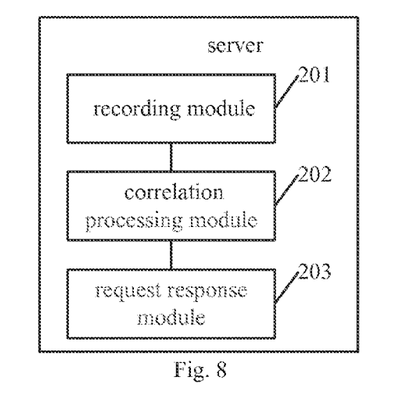
FIG. 8 is a diagram of a server provided according to various embodiments.

FIG. 8 is a diagram of a server according to various embodiments of the present disclosure. Referring to FIG. 8, the server can be server on the data sharing system and can include a recording module 201, a correlation processing module 202, and a request response module 203. The recording module 201 is configured to, after a communication account is logged in to a browser of the first client, record an address identifier of the first client, and after the communication account is logged in to a browser of the at least one second client, record an address identifier of the at least one second client. The address identifier can uniquely identify the client. Communication with the client can be performed through the address identifier of the client. For example, the address identifier can be a phone number of a mobile terminal and other mobile terminals, PC's IP addresses, etc.

The correlation processing module 202 is configured to correlate the address identifier of the first client with the address identifier of the at least one second client. The correlation processing module 202 is configured to correlate clients from which the same communication account is logged in to at multiple points with each other, so that data sharing can be realized between the correlated clients. The request response module 203 is configured to return the address identifier of the at least one second client which correlates with the address identifier of the first client to the first client according to the request of the first client.

It should be noted that structures and functions of the client according to various embodiments of the present disclosure can refer to implementations of the methods shown in FIGS. 2-3, and will not be repeated here.

According to various embodiments of the present disclosure, after multipoint login of the communication account from the browser of the first client and the browser of at least one second client, the first client can select at least one sharing client from the at least one second client according to the data sharing instruction, and sends the shared data in the browser of the first client to the sharing client, thereby realizing data sharing between the first client and the sharing client. According to various embodiments of the present disclosure, the data sharing can be implemented based on the communication account, the first client and the sharing client need not be connected by wires. Therefore, the operations of the data sharing are simple and the efficiency of the data sharing is enhanced.

Figure 9:
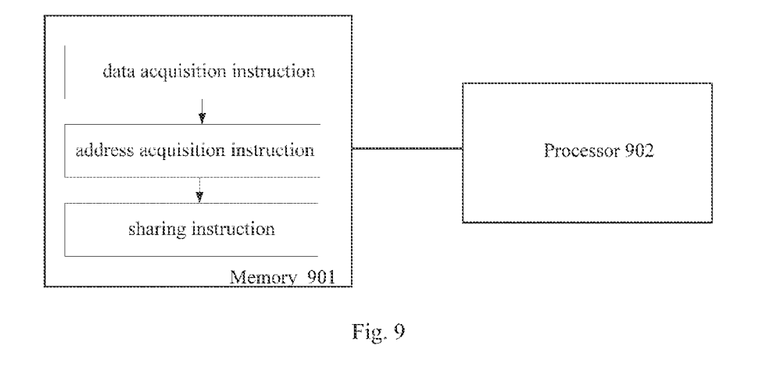
FIG. 9 is a diagram of a client provided according to various embodiments.

FIG. 9 is a diagram of a client according to various embodiments of the present disclosure. Referring to FIG. 9, the client may include a memory 901 and a processor 902. The memory 901 may store a data acquisition instruction, an address acquisition instruction, and a sharing instruction. The processor 902 may communicate with the memory 901, execute the data acquisition instruction, the address acquisition instruction, and the sharing instruction to respectively execute operations of the above data acquisition module 101, the address acquisition module 102, and the sharing module 103.

Figure 10:
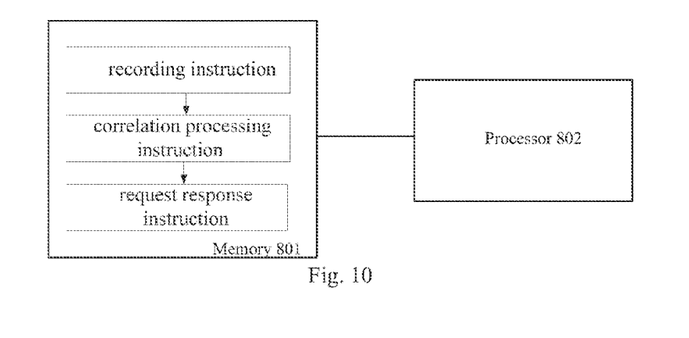
FIG. 10 is a diagram of a server provided according to various embodiments.

FIG. 10 is a diagram of a server according to various embodiments of the present disclosure. Referring to FIG. 10, the server may include a memory 801 and a processor 802. The memory 801 may store a recording instruction, a correlation processing instruction, and a request response instruction. The processor 802 may communicate with the memory 801, execute the recording instruction, the correlation processing instruction, and the request response instruction to respectively execute operations of the above recording module 201, the correlation processing module 202, and the request response module 203.

According to various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module mechanically, in dedicated and permanently configured circuitry, or in temporarily configured circuitry (e.g., configured by software) may be driven by cost and time considerations.

What has been described and illustrated herein are various embodiments of the disclosure along with some variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A data sharing method comprising:
    logging in a browser of a first client and a browser of at least one second client using a same communication account and with a multipoint login mode;
    acquiring, by the first client, shared data from the browser of the first client if receiving a data sharing instruction;
    selecting, by the first client, at least one sharing client from the at least one second client and acquiring an address identifier of each of the at least one sharing client;
    sending, by the first client, the shared data to at least one sharing client according to the address identifier of each of the at least one sharing agent, wherein the first client and the at least one sharing client are not connected by wires;
    outputting by the first client, a sharing prompt message according to a sending status of the shared data; and
    outputting, by the at least one sharing client, the shared data;
    wherein the logging in includes:
    recording, by a server, an address identifier of the first client, and an address identifier of the at least one second client; and
    creating a correspondence, by the server, of the address identifier of the first client with the address identifier of the at least one second client; and
    wherein the selecting includes:
    requesting by the first client from the server the address identifier of each of the at least one second client which corresponds to the address identifier of the first client, wherein the server receives a request message from the first client that carries the logged in communication account in the browser of the first client;
    receiving, by the first client, the address identifier of each of the at least second client returned by the server; and
    selecting, by the first client, at least one address identifier from the address identifier of each of the at least one second client returned by the server as the address identifier of the at least one sharing client.

2. The method of claim 1, wherein the acquiring, by the first client, shared data from the browser of the first client if receiving a data sharing instruction comprises:
    when the first client receives the data sharing instruction of sharing data of a current webpage in the browser of the first client, acquiring, by the first client, shared data instructed by the data sharing instruction from the current webpage;
    taking, by the first client, the acquired data as the shared data;
    wherein the shared data includes one or more of website, text data, picture data, audio data and video data.

3. A client comprising:
    a processor for executing instructions stored in a non-transitory machine readable storage medium to:
    use a same communication account to log in a browser of a first client and a browser of at least one second client with a multipoint login mode, wherein the log in enables a server to record an address identifier of the first client and an address identifier of the at least one second client, and to create a correspondence of the address identifier of the first client with the address identifier of the at least one second client;
acquire shared data from the browser of a local client if receiving a data sharing instruction;
select at least one sharing client from the at least one second client, and acquiring an address identifier of each of the at least one sharing client;
send the shared data to the at least one sharing client according to the address identifier of each of the at least one sharing client, wherein the local client and the at least one sharing client are not connected by wires;
output a sharing prompt message according to a status of the shared data; and
output the shared data at the at least one sharing client;
wherein the instructions stored in the non-transitory machine readable storage medium cause the processor to:
request from the server an address identifier of each of the at least one second client which corresponds to an address identifier of the local client, wherein the server receives a request message from the first client that carries the logged in communication account in the browser of the first client;
receive the address identifier of each of the at least one second client returned by the server; and
select at least one address identifier from the address identifier of each of the at least one second client returned by the server as the address identifier of the at least one sharing client.

4. The client of claim 3, wherein the instructions stored in the non-transitory machine readable storage medium cause the processor to:
after receiving the data sharing instruction for data of a current webpage in the browser of the local client, acquire the data instructed by the data sharing instruction from the current webpage;
take the acquired data as the shared data;
wherein the shared data includes one or more of website, text data, picture data, audio data and video data.

5. A data sharing system comprising a shared data providing client, shared data receiving client, and a server;
wherein the shared data providing client comprises:
a first processor for executing instructions stored in a first non-transitory machine readable storage medium to:
after a same communication account is logged in the shared data providing client and the shared data receiving client with a multipoint login mode, acquire shared data from the shared data providing client if receiving a data sharing instruction;
send a request message to the server for requesting the address identifier of the shared data receiving client wherein the request message carries the communication account and the address identifier of the shared data providing client;
acquire the address identifier of the shared data receiving client from the server;
send the shared data to the shared data receiving client according to the address identifier of the shared data receiving client, wherein the shared data providing client and the shared data receiving client are not connected by wires; and
output a sharing prompt message according to a sending status of the shared data;
wherein the shared data receiving client includes a second processor for executing instructions stored in a second non-transitory machine readable storage medium to receive the shared data and output the shared data; and
the server includes a third processor for executing instructions stored in a third non-transitory machine readable storage medium to:
after the communication account is logged in the shared data providing client and the shared data receiving client, record an address identifier of the shared data providing client and the address identifier of the shared data receiving client;
correlate the address identifier of the shared data providing client with the address identifier of the shared data receiving client; and
return the address identifier of the shared data receiving client which is correlated with the address identifier of the shared data providing client to the shared data providing client according to the request message.

* * * * *